United States Patent [19]

Young et al.

[11] Patent Number: 4,965,686
[45] Date of Patent: Oct. 23, 1990

[54] DISC DRIVE ASSEMBLY FOR MAGNETIC DISC MEMORY UNIT

[75] Inventors: Paul R. Young, Cromwell; David W. Richard, Meriden; Arthur J. Treff, East Hartford; Christopher E. Staehly, East Haddam, all of Conn.

[73] Assignee: Raymond Engineering Inc., Middletown, Conn.

[21] Appl. No.: 331,462

[22] Filed: Mar. 31, 1989

[51] Int. Cl.[5] .............................................. G11B 17/08
[52] U.S. Cl. .............................. 360/98.07; 360/99.08
[58] Field of Search ............... 360/98.07, 98.04, 99.08; 310/67 R, 156

[56] References Cited

U.S. PATENT DOCUMENTS 4,604,665  8/1986  Muller ............................... 360/97.02
4,607,182  8/1986  Ballhaus ......................... 360/99.08 X Primary Examiner—A. J. Heinz
Attorney, Agent, or Firm—Fishman, Dionne & Cantor

[57] ABSTRACT

A disc drive assembly for a magnetic disc memory unit is presented. The disc drive assembly has a stationary spindle to which a motor stator assembly is fastened by a wedge ring structure. The motor rotor assembly is constituted by a rotary hub mounted around the stator, the hub having a motor magnet mounted therein. A plurality of magnetic discs may be mounted on the exterior of the hub.

11 Claims, 4 Drawing Sheets

DISC DRIVE ASSEMBLY FOR MAGNETIC DISC MEMORY UNIT

SUMMARY OF THE INVENTION

This invention relates to the field of magnetic disc memory units. More particularly, this invention relates to a disc drive assembly; and further this invention relates to a disc drive assembly which is especially suitable for use in a high capacity ruggedized memory disc unit suitable for use in hostile or severe environments and which is capable of withstanding loads or stresses, such as shock, vibration and temperature extremes. The disc drive assembly of this invention is capable of operating at any altitude or orientation, thus making it suitable for aerospace applications. The disc drive assembly of the present invention is particularly suitable for use in magnetic disc memory units intended for military applications, but it may also find use in other demanding environments, such as, for example, oil and gas well drilling and seismic exploration.

The assignee of this application is also the assignee of prior applications Ser. Nos. 821,101 and 941,820, both of which relate to magnetic disc memory units.

The disc drive assembly of the present invention has a stationary spindle around which there is mounted a rotary hub. A plurality of magnetic discs are mounted on the exterior of the rotary hub, the discs being appropriately separated by spacers on the hub.

A motor is incorporated in the disc drive assembly, with the stator being secured to the stationary spindle, and the rotor being mounted on the rotary hub. A wedge-ring structure is employed to lock the stator to the spindle, with the rings being locked by a bar through the spindle. The unit also incorporates a static discharge mechanism to dissipate static charge build-up on the spindle; and a bearing preload structure is incorporated to preload the bearings to reduce the effects of vibration.

For enhanced stability, the spindle is secured at both ends, one end being threaded into a base plate on the case of the magnetic disc unit, and the other end being secured by a clock plate which is fastened to the case.

The disc drive assembly of the present invention is a rugged and reliable unit which can be preassembled as a module and installed as a module in the case of the magnetic disc unit.

The above discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

To avoid confusion in the numbering of parts, FIG. 3 is shown twice so that the reference numbers can be divided between the two showings.

DESCRIPTION OF THE PREFERRED EMBODIMENT

Figure 1:
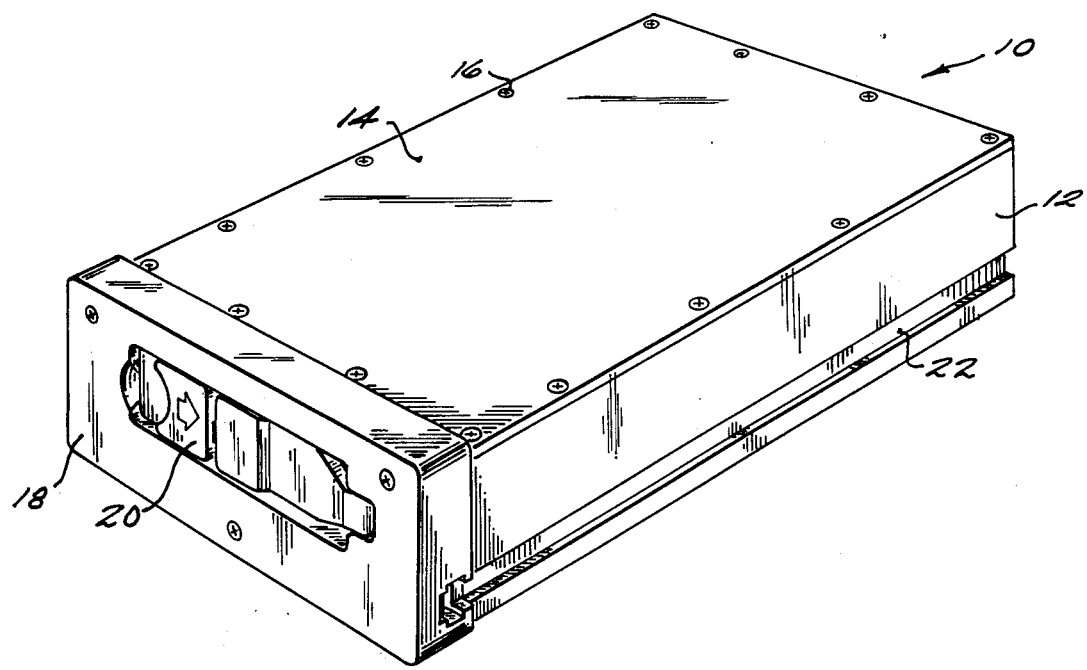
FIG. 1 is a perspective view of the exterior casing or housing of a magnetic disc memory unit incorporating the disc drive assembly of this invention.
Figure 2:
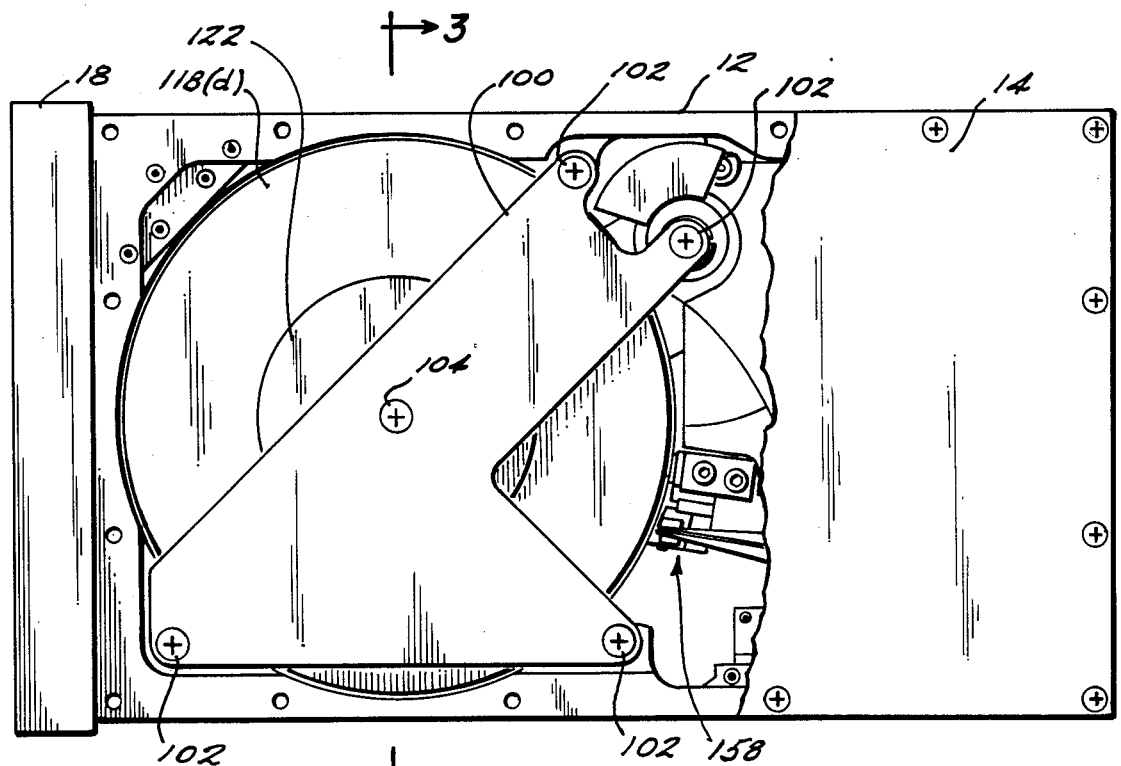
FIG. 2 is a top plan view of the unit of FIG. 1 with the top cover removed and showing the spindle drive unit.
Figure 3:
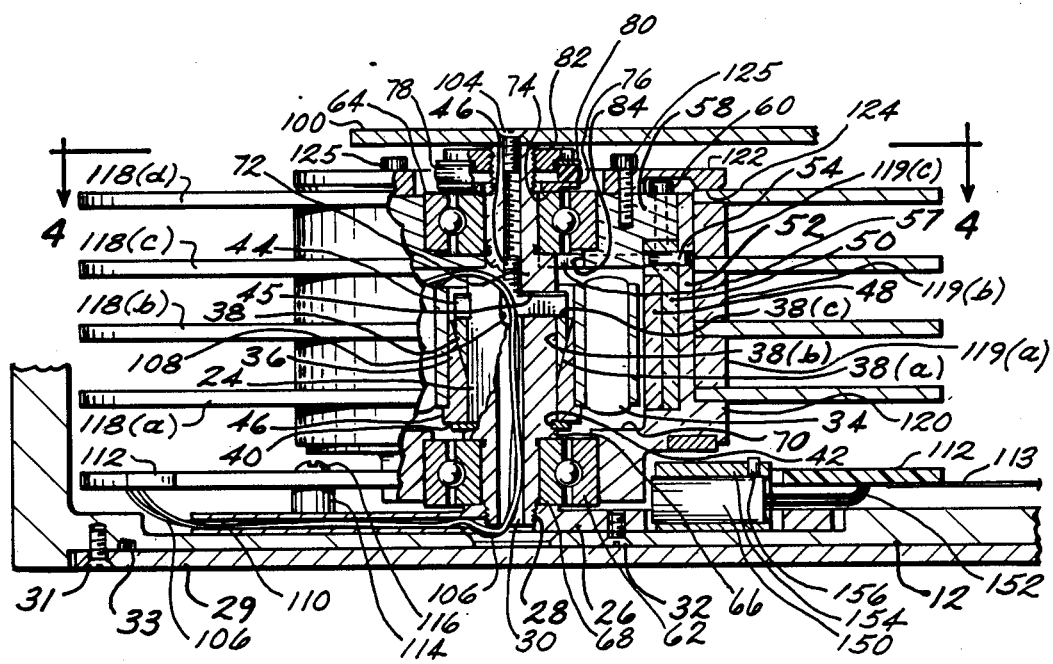
FIG. 3 is a sectional elevation view taken along line 3—3 of FIG. 2 to show the disc drive unit in sectional elevation.
Figure 4:
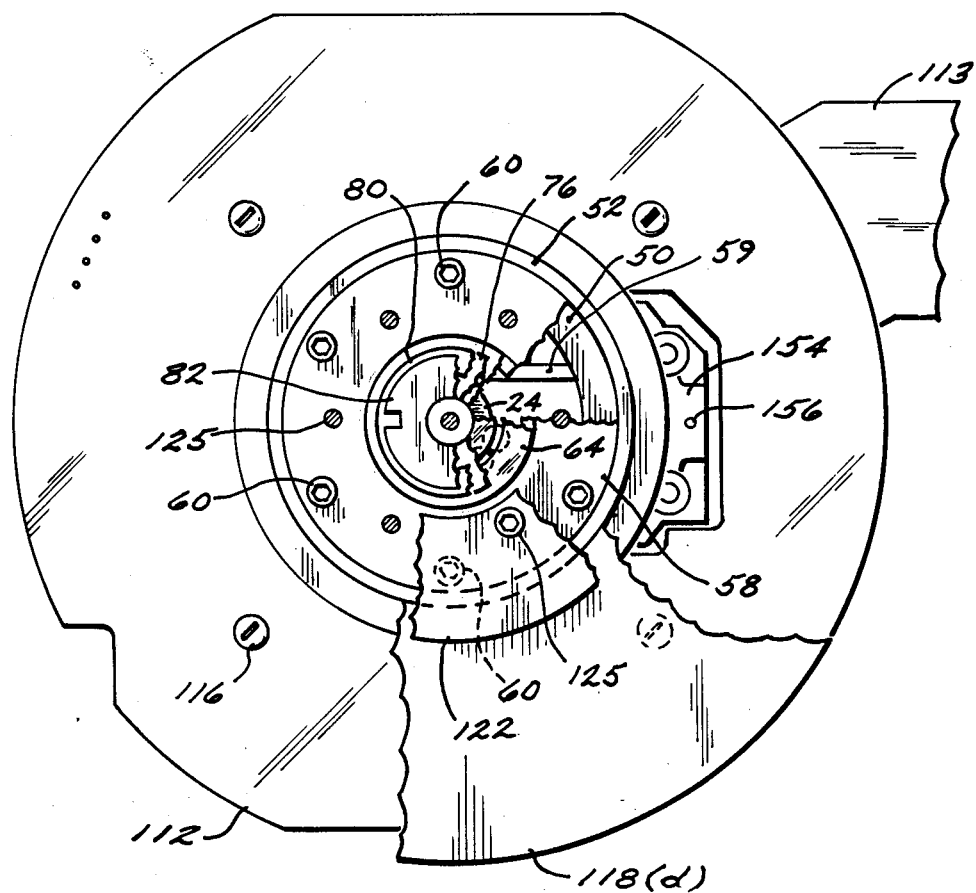
FIG. 4 is a top plan view of the disc drive unit taken along line 4—4 of FIG. 3 with the discs, retainer and cap shown in a cut-away view and the lower housing omitted.
Figure 5:
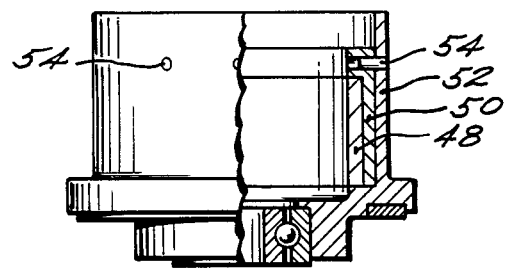
FIG. 5 is an elevation view, partly in section, of the rotor of the disc drive unit of FIG. 3.
Figure 6B:
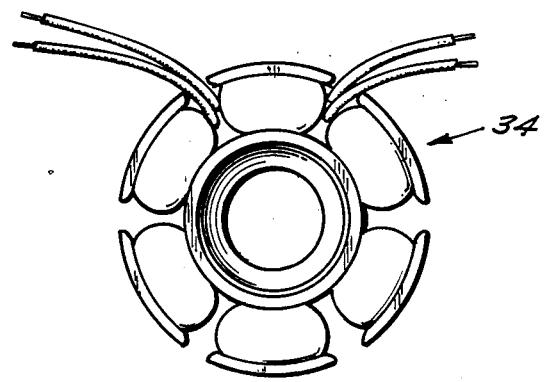
FIG. 6B is a top plan view of the stator of FIG. 6A.
Figure 6A:
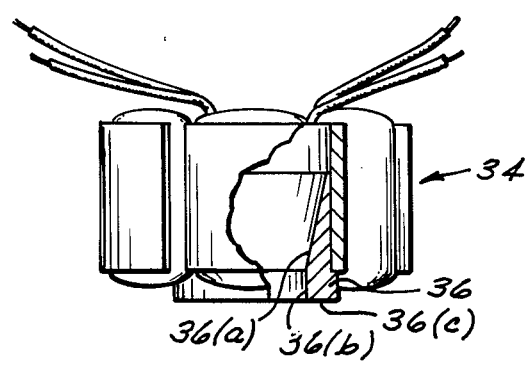
FIG. 6A is an elevation view, partly in section, of the stator unit of FIG. 3.

Referring now to FIG. 1, the exterior housing for the unit of the present invention is shown. Housing 10 has a main housing section 12 with a removable cover plate 14 which is fastened to main housing section 12 with a plurality of screw fasteners 16. Housing section 12 and cover plate 14 are of metal, preferably aluminum. A front cover 18 is attached to housing section 12, and cover 18 has a release latch mechanism 20 for locking the housing into or releasing it from a vibration cradle (not shown) equipped with shock mounts in which the unit would be mounted. Housing section 12 has mounting grooves 22 along the length of its two opposite sides, and these grooves mate with corresponding runners or guides in the cradle. To insure that the unit is properly mounted in the cradle (and to insure proper alignment with electrical connectors on the back end of the unit), the grooves 22 are offset on the two sides of the unit (as are the mating guides in the cradle). Since the grooves and mating guides are asymmetric, the unit can only be mounted in one position (i.e., the proper one) in the cradle.

Referring now to a combined consideration of FIGS. 2 through 6, the details of the disc drive assembly of the present invention are shown. A steel spindle shaft 24 is mounted on a support plate 26. Spindle shaft 24 is attached to support plate 26 by screw threads 28, and spindle shaft 24 has a hollow interior defining a central passageway 30. Support plate 26 is, in turn, fastened to the bottom of outer case 12 by a plurality of screws 32. A lower cover plate 29 is fastened to the bottom of case 12 by a plurality of screws 31; and an "O" ring extending around the perimeter of plate 29 inboard of the screws 31 provides a positive seal at the lower plate. The upper end of spindle 24 is held by a clock plate 100 which is securred to main housing 12 by four screws 102 at spaced apart locations to provide stability. A screw 104 fixes the upper end of spindle shaft 24 to clock plate 100. Thus, both the upper and lower ends of spindle shaft 24 are rigidly held.

An annular motor winding 34, which forms the stator of an electric motor, is mounted on shaft 24 via a pair of steel wedge ring elements 36 and 38. Stator 34 is adhesively bonded to the O.D. of the first ring element 36, the O.D. of which is cylindrical and the inner surface of which is inclined along an upper part 36(a) thereof to form a wedge element. Ring element 36 also has a lower cylindrical I.D. part 36(b) which forms a slip fit around the O.D. of spindle shaft 24. A snap ring 40 sits in a groove 42 in spindle shaft 24 to support ring element 36 and stop it from downward movement along the axis of spindle shaft 24. The second wedge ring element 38 has a lower inclined surface 38(a) which conforms to and bears against inclined surface 36(a) and an upper cylindrical I.D. part 38 (b) which forms a slip fit around the O.D. of spindle shaft 24. In assembling these elements, snap ring 40 is put into place, and ring element 36 (with stator 34 bonded thereto) is placed over shaft 24 with the enlarged flat end 36(c) of ring 36 resting against snap ring 40. Next, ring element 38 is placed over shaft 24 and inclined surface 38(a) is loaded into wedging engagement with inclined surface 36(a). The effect of this wedging action is to load ring elements 36 and 38 into firm 10 engagement with spindle shaft 24. A rectangular lock bar 44 Passes through a correspondingly shaped opening 45 in spindle shaft 24 and engages the flat top surface 38(c) of ring 38 to lock the rings in place. A set screw 46 is threaded into the internal passage 30 in spindle shaft 24, and bears on lock bar 44 to lead lock bar 44 into firm engagement with ring element 38. In addition to being bonded to ring element 36, stator 34 seats against a shoulder 46 on ring element 36 to provide both a heat sink and an electrical ground for stator 34.

The rotor structure of the motor has an annular magnet 48 which is adhesively bonded to a steel sleeve 50 which, in turn, is locked to a rotary outer steel hub 52. Hub 52 and sleeve 50 are locked together by a series of circumferentially spaced pins 54 which are friction fit into aligned holes in hub 52 and the enlarged upper end 56 of sleeve 50 and adhesively bonded in place.

An annular cap 58 fits within the O.D. of hub 52 at the upper end thereof, and cap 58 is fixed to sleeve 50 by a series of circumferentially spaced screws 60. A pair of static discharge brushes 57 (only one of which is shown) are mounted on opposite sides of the bottom of cap 58 by leaf spring mounts 59. The brushes contact the upper end of spindle 24 to eliminate uncontrolled static discharge from the rotor assembly.

Magnet 48, sleeve 50, hub 52 and cap 58 constitute a rotor structure which rotates around the stator structure mounted on spindle shaft 24, so this rotor structure must be mounted on bearings. Accordingly, the rotor structure is mounted on lower and upper bearings 62 and 64. The inner race of lower bearing 62 is trapped and locked against rotation between a shoulder 66 on spindle shaft 24 and a shoulder 68 on base plate 26. A radially inwardly extending flange 70 from hub 52 engages the rotating outer race of bearing 62. Similarly, the inner race of upper bearing 64 is trapped and locked against rotation between a shoulder 72 on spindle shaft 24 and a shoulder 74 on a washer 76. Washer 76 is held in place by "O" ring 78, a washer 80 and a nut 82 which is threaded onto the top of spindle shaft 24. The rotary outer race of bearing 64 engages a radially inwardly Projecting flange 84 on cap 58. Thus, the rotor structure of magnet 48, sleeve 50, hub 52 and cap 58 are supported for rotation by the bearings 62 and 64.

A preload force is imposed on bearings 64 by nut 82 acting through washer 80, "O" ring 78 and washer 76 to impose a lead on the inner race which, in turn, is transferred through to the balls of bearing 64 to load the outer race against the flange 84 on cap 58. The preload is also imposed on bearing 62 by being transmitted from cap 58 through sleeve 50 and outer hub 52 to load the outer race of bearing 62, and thence through the balls of bearing 62 to react against plate 26. The preload operates to maintain contact throughout the bearing pack to reduce the effects of shock load and vibration.

Wires 106 from the windings of stator 34 pass into central passage 30 in spindle shaft 24 through a pair of opposed openings 108 in spindle shaft 24. Openings 108 in spindle shaft 24 are spaced 90° from the openings 45 through which bar 45 passes. The wires 106 pass through a passage 110 in plate 26 and are connected to a printed circuit board or buss 112. P.C. board 112 is spaced from and attached to plate 26 by a plurality of spacers 114 and screws 116 which thread into plate 26. Current is delivered through wires 106 to the windings of stator 34 to drive the rotor and discs 118(a)-118(d). A flexible cable 113 connects the P.C. board to other components in the unit. A tachometer 150 which monitors the r.p.m. of the rotor is also connected by electrical leads 152 to the P.C. board. Tachometer 150 is located between housing 12 and a retainer plate 154 and is retained by a set screw 156.

A plurality of magnetic memory discs 118(a)-118(d) are mounted on the O.D. of rotor 52. The lowermost disc 118(a) sits on a flange 120 on the lower part of rotor 52. The remaining disc 118(b)-118(d) are spaced apart by spacers 119(a)-(c). The stack of discs 118(a)-(d) and spacers 119(a)-(c) are held in place on rotor 52 by a circular retainer plate 122 which has a depending annular ridge 124 at the O.D. thereof which imposes a downward and uniform level on the I.D. of the discs 118(a)-118(d). Retainer plate 122 is locked to cap 58 by a plurality of screws 125.

Each of the discs 118(a)-118(d) has 10 megabytes of memory capacity (5 megabytes per side), so the unit of this invention has 40 megabyte capacity. The discs are accessed for memory storage and/or retrieval by a plurality of head mechanisms mounted on a single rotary arm such as shown in U.S. application No. 941,820 and indicated generally at 158 in FIG. 2. The head mechanism, rotary arm and the drive and control for the rotary arm are as shown in No. 941,820, and these details will not be repeated here since they do not form a part of the invention of 10 this application.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A disc drive assembly including:

base plate means;

spindle shaft means fixed to said base plate means at a first end of said spindle shaft means;

stator means positioned around said spindle shaft means;

mounting means for mounting said stator means on said spindle shaft means, said mounting means including;

a first wedge member fixed to said stator means;

a second wedge member around said spindle shaft means and mating with said first wedge member, and loading means loading said second wedge member against said first wedge member;

rotor means around said stator means;

bearing means positioned between said spindle shaft means and said rotor means to rotatably support said rotor means for rotation about said means and spindle means; and a plurality of discs mounted in spaced apart relationship on said rotor means.

2. A disc drive assembly as in claim 1 wherein:

said first wedge member is a ring having a cylindrical part forming a slip fit about said spindle shaft means and a first inclined surface;

second wedge member is a ring having a cylindrical part forming slip fit about said spindle shaft means and having a second inclined surface which bears against said first inclined surface.

3. A disc drive assembly as in claim 2 wherein:
said loading means is a bar passing through said spindle shaft means and bearing against said second wedge member to load said second wedge member against said first wedge member.

4. A disc drive assembly as in claim 3 including:
a retainer means on said spindle shaft means for positioned said first wedge member about said spindle shaft means.

5. A disc drive assembly as shown in claim 1 wherein said bearing means includes:
a first bearing about one end of said spindle shaft means adjacent said base plate means; and
a second bearing about the other end of said spindle shaft means.

6. A disc drive assembly as in claim 5 including:
flange means at one end of said rotor means and connected to said first bearing; and
cap means affixed to said rotor means and connected to said second bearing.

7. A disc drive assembly as in claim 6, including:
means to impose a preload on said bearings.

8. A disc drive assembly as in claim 6 including:
static discharge means supported by said cap and in contact with said spindle shaft means to eliminate uncontrolled static discharge from said rotor means.

9. A disc drive assembly as in claim 1 including:
second plate means; and
means connecting the second end of said spindle shaft means to said second plate means.

10. A disc drive assembly as in claim 1 including:
retainer means connected to said rotor means imposing a load on the I.D. of said discs.

11. A disc drive assembly as in claim 1 including:
static discharge means extending between said rotor means and said spindle shaft means and being in contact with said spindle shaft means to control static discharge from said rotor means.

* * * * *